Patented Jan. 19, 1932

1,841,944

UNITED STATES PATENT OFFICE

ERNEST WALTER GEERE, OF BECKENHAM, ENGLAND

PRODUCTION OF ACID SUBSTANCES USED IN THE PRODUCTION OF CARBON DIOXIDE

No Drawing. Application filed September 4, 1928, Serial No. 303,960, and in Great Britain September 9, 1927.

This my invention relates to the control or regulation of the production of carbon dioxide by the intimate admixture of a free acid such as phosphoric, sulphuric, or any other suitable liquid acid with a salt, e. g. phosphates, the acid being added in such quantities that the acid salt is obtained holding free acid.

The substance thus obtained is treated with a medium such as a fat, wax, or hydrogenated oil, whereby when in combination with a carbonate and/or bi-carbonate the speed of the reaction is governed and carbon dioxide is not evolved in the desired quantities until a definite temperature is reached; this point can be varied by the adoption and choice of a suitable medium, and a much less quantity of the acid substance is required to produce a given quantity of carbon dioxide than is required when the acid salt is made use of.

The production of the acid substance is carried out in the following manners:—

(a) In the usual process of the manufacture of acid salts, the acid is added in excess and the substance is then dehydrated. The anhydrous mixture so produced is allowed to cool to a temperature just below the melting point of the medium used, when the medium which has previously been melted is added, the whole being agitated and the temperature maintained during the process.

(b) An acid or neutral salt is treated with the requisite quantity of a suitable acid by thorough agitation in the cold or under moderate heat. To the substance so produced the molten medium is added and treated in the aforesaid manner.

Definite quantities of untreated acid phosphates, acid sulphates, acid salts, etc., are incorporated in the product so obtained, which quantities are variable in accordance with the quantity of medium employed as well as with the desired final acid content. The incorporation is effected in roller mills and similar machines which cause the unprotected particles to enter into a mechanical union with the protected particles and the distribution of the protecting substance or medium over the whole mass to be uniform to a degree which cannot be attained without milling together.

I claim:—

A method of preparing carbon dioxide evolving powders and the like, comprising coating only a portion of the acid constituents with a layer of a protecting medium and incorporating the remainder of the acid constituents by milling in roller mills and the like.

ERNEST WALTER GEERE.